(12) United States Patent
Schmitt

(10) Patent No.: US 6,760,948 B2
(45) Date of Patent: Jul. 13, 2004

(54) SNAP LATCH DRUM RELEASE FOR A DRAIN CLEANING MACHINE

(75) Inventor: Randall Paul Schmitt, Clinton Township, MI (US)

(73) Assignee: Masco Corporation, Taylor, MI (US)

( * ) Notice: Subject to any disclaimer, the term of this patent is extended or adjusted under 35 U.S.C. 154(b) by 264 days.

(21) Appl. No.: 09/931,471

(22) Filed: Aug. 16, 2001

(65) Prior Publication Data

US 2003/0035685 A1 Feb. 20, 2003

(51) Int. Cl.⁷ .................................................. B08B 9/04
(52) U.S. Cl. .............................. 15/104.33; 15/104.31; 403/322.1; 254/134.3 FT
(58) Field of Search ....................... 15/104.33; 403/321, 403/322.1, 322.3, 322.4, 324, 325; 242/407; 254/134.3 FT

(56) References Cited

U.S. PATENT DOCUMENTS

| | | | |
|---|---|---|---|
| 3,246,354 A | * 4/1966 | Cooney et al. | 15/104.33 |
| 4,364,139 A | * 12/1982 | Babb et al. | 15/104.33 |
| 5,031,276 A | 7/1991 | Babb et al. | |
| 5,193,242 A | * 3/1993 | Irwin | 15/104.33 |
| 5,507,062 A | 4/1996 | Salecker | |
| 5,618,123 A | 4/1997 | Pulse | |
| 5,640,736 A | 6/1997 | Salecker | |
| 6,243,905 B1 | 6/2001 | Rutkowski | |
| 6,615,436 B1 | * 9/2003 | Burch, Jr. et al. | 15/104.33 |
| 6,618,891 B2 | * 9/2003 | Schmitt | 15/104.33 |

* cited by examiner

Primary Examiner—Theresa T. Snider
(74) Attorney, Agent, or Firm—Carlson, Gaskey & Olds PC

(57) ABSTRACT

A snap latch drum release assembly includes a multiple of latches which engage the inner diameter of a plate spaced away from a rotary drum to lock and unlock the rotary drum of a drain cleaning machine without the need for tools. As the latches engage a plate on the drum, no shaft grooves are located in the shaft to weaken it. The snap latch drum release assembly is mounted on a support frame assembly. Lifting of an actuating handle engages pins in the latch surfaces to overcome their spring bias and simultaneously drive the latches away from the plate to allow release of the drum. To mount the drum, the drum shaft is pushed into the sleeve and the latches are received onto the latch plate.

19 Claims, 5 Drawing Sheets

SNAP LATCH DRUM RELEASE FOR A DRAIN CLEANING MACHINE

BACKGROUND OF THE INVENTION

The present invention relates to a drain cleaning machine, and more particularly to a release assembly for removing the rotatable drum from the machine without tools.

Conventional drum type drain cleaning machines typically include a frame structure supporting a rotatable snake drum and a drive motor arrangement for rotating the drum. The frame structure also supports a snake feeding arrangement by which the snake or cable is axially displaced relative to the rotating drum during use of the machine. The snake coiled within the rotatable drum is displaced by the feeding arrangement and inserted into a pipe or drain to be cleaned. Rotation of the drum rotates the snake to achieve such cleaning.

The rotatable drum in known drain cleaning machines may typically be removed from the support frame and drive arrangement to facilitate replacement of the drum with one containing a snake having a different diameter and to make the separate components more mobile. Disadvantageously, conventional removable drums require tools to disassemble the rotatable drum from the support frame. This, of course, requires access to the proper tools and is also somewhat time consuming for the operator. Other known disassembly arrangements require a groove cut in a shaft which mounts the rotatable drum. The groove is located between the rotatable drum and the support frame to receive a spring loaded pin which rides within the groove. The pin is retracted to disassemble the rotatable drum from the support frame. By its location, the groove reduces the strength of the shaft in a weight bearing segment. Friction between the groove and the single pin may also eventually require the repair or replacement of the disassembly arrangement. Further, the pin must be manually retracted to both install and remove the rotatable drum.

Accordingly, it is desirable to provide a rotatable drum release assembly which provides an effective release without the necessity of tools and which locates shaft grooves in a position to minimize their load bearing effect on the shaft. It is further desirable to provide a rotatable drum release assembly that need not be manually actuated to assemble the rotatable drum to the support frame.

SUMMARY OF THE INVENTION

The drum release assembly according to the present invention provides a latch which engages an inner diameter of a plate spaced away from a rotary drum to lock and unlock the rotary drum to a drain cleaning machine. The drum shaft extends from a sleeve in a cantilevered manner and as the latch engages the plate, no shaft grooves are located in the shaft. Localized weakening of the shaft is thereby prevented.

Each latch is telescopically mounted within a latch sleeve which forms a substantially T-shaped arrangement with the shaft sleeve. Biasing members within each latch sleeve bias a latch outward. The latch sleeves extend for a linear distance less than the diameter of the inner opening of plate while the latches extend from the latch sleeves a total linear distance just greater than the diameter of the inner opening.

To mount the drum, the drum shaft is pushed into the sleeve. Contact between a wedge shaped face of the latch and inner opening of the plate forces the latches to be retracted into the latch sleeves. Once the inner opening of the plate passes the latches, the biasing members drive the latches outward. The drum is thereby rotatably locked in place by the interaction between the extended latches and the inner opening of the plate.

Lifting an actuating handle engages cam surfaces with the latches to simultaneously retract the latches into the latch sleeves. Once the latches are linearly retracted to a distance less than the inner opening of the plate, the drum is released.

The present invention therefore provides a rotatable drum release assembly which provides an effective release without the necessity of tools and which eliminates shaft grooves. The present invention further provides a rotatable drum release assembly that need not be manually actuated to assemble the rotatable drum to the support frame.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
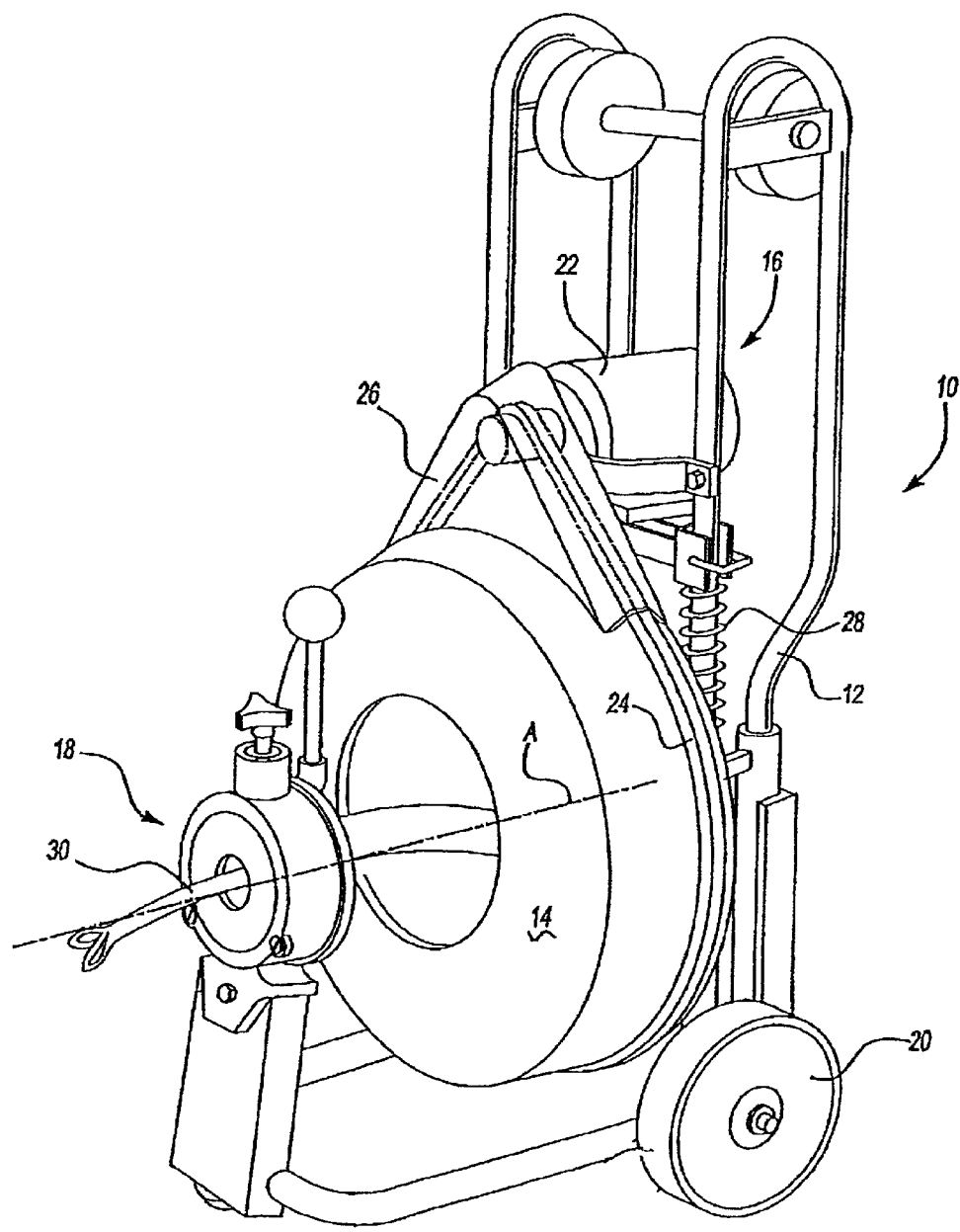
FIG. 1 is a general perspective view of a drain cleaning machine having a removable rotatable drum according to the present invention.

FIG. 1 illustrates a general perspective view of a portable drain cleaning machine 10 including a wheeled support frame assembly 12 which supports a rotatable snake drum 14, a drum drive assembly 16, and a snake feeding mechanism 18. Support frame assembly 12 is provided with at least one pair of wheels 20 such that the machine 10 is supported for rolling movement from one location to another.

The drum drive assembly 16 preferably includes an electric motor 22 which drives a drive belt 24. A removable cover 26 provides protection for the engagement between the belt 24 and motor 22. The motor 22 is mounted upon a biasing arrangement 28 which minimizes slack in the drive belt 24 and compensates for components which may be out of alignment while allowing removal of the belt 24.

The drum 14 contains a flexible plumbers snake 30 which extends outwardly through the feed assembly 18. The feed assembly 18 displaces the snake 30 inwardly and outwardly relative to the drum 14 during operation of the machine 10. The drive belt 24 extends from the motor 22 and about the perimeter of the drum 14. It should be understood that although the belt is illustrated about the perimeter of the drum in the disclosed embodiment, other drive arrangements will also benefit from the present invention. Rotation of the drive belt 24 rotates the drum 14 about an axis of rotation A.

Figure 2:
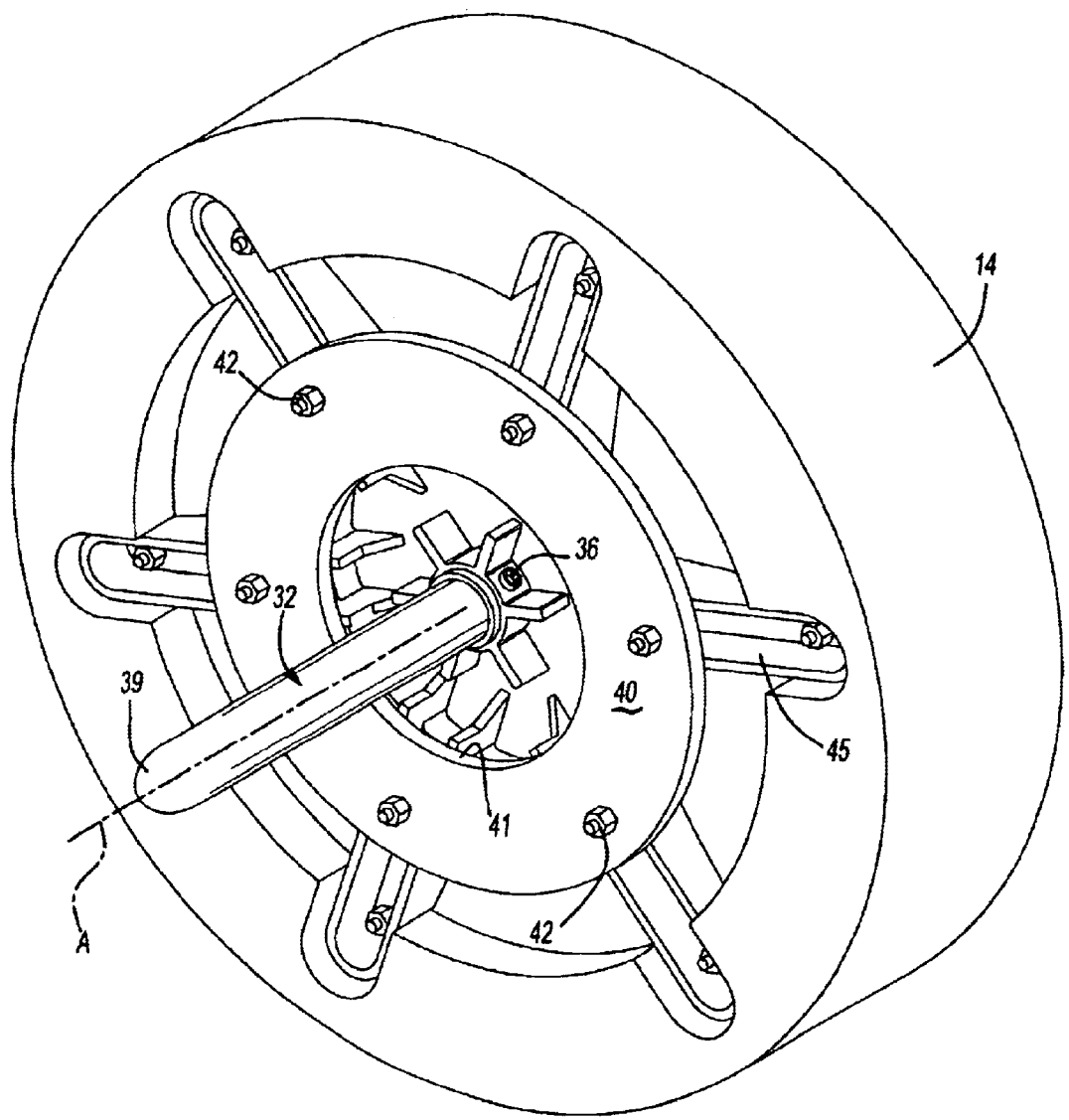
FIG. 2 is a rear perspective view of a removable rotatable drum.

Referring to FIG. 2, a rear view of the drum 14 illustrates a drum shaft 32 extending therefrom. The drum shaft 32 is mounted to the drum 14 by at least one fastener 36 such as a set screw of the like which engages a flat on the shaft 32 (not shown.) The drum shaft 32 defines the axis of rotation A. The shaft includes a substantially rounded distal end 39. It should be understood that distal ends such as flat, rounded, pointed, tapered and the like will also benefit from the present invention. Preferably, the shaft includes no grooves or the like that may decrease the shaft strength. A smaller diameter and lighter shaft will thereby benefit from the present invention.

A plate 40 is coaxially attached to the drum 14 to extend about the shaft 32. Preferably, the plate 40 is a substantially annular disc having an inner opening 41 which revolves about the axis of rotation A. The plate 40 is affixed to the drum 14 by a multiple of fasteners 42 adjacent the plate 40 outer perimeter. The fasteners 42 are received in support ribs 45 of the drum 14 such that the inner opening, 41 is spaced away from the drum 14 and the shaft 32. It should be understood that although a separate annular disk is disclosed in the illustrated embodiment, other plates and integral portions of the drum will also benefit from the present invention.

Figure 3:
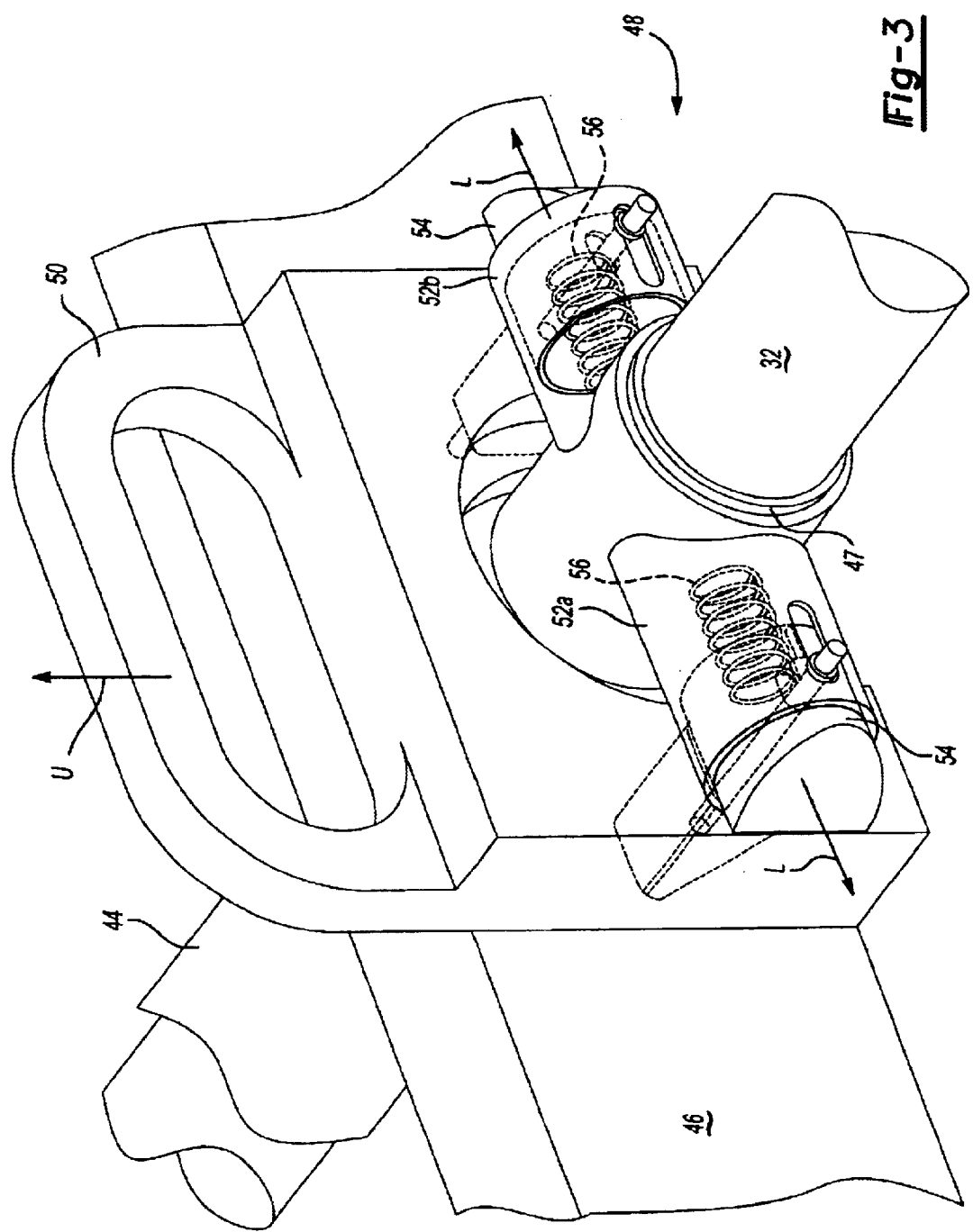
FIG. 3 is a front perspective view of a drain cleaning machine having a snap latch drum release assembly.
Figure 4:
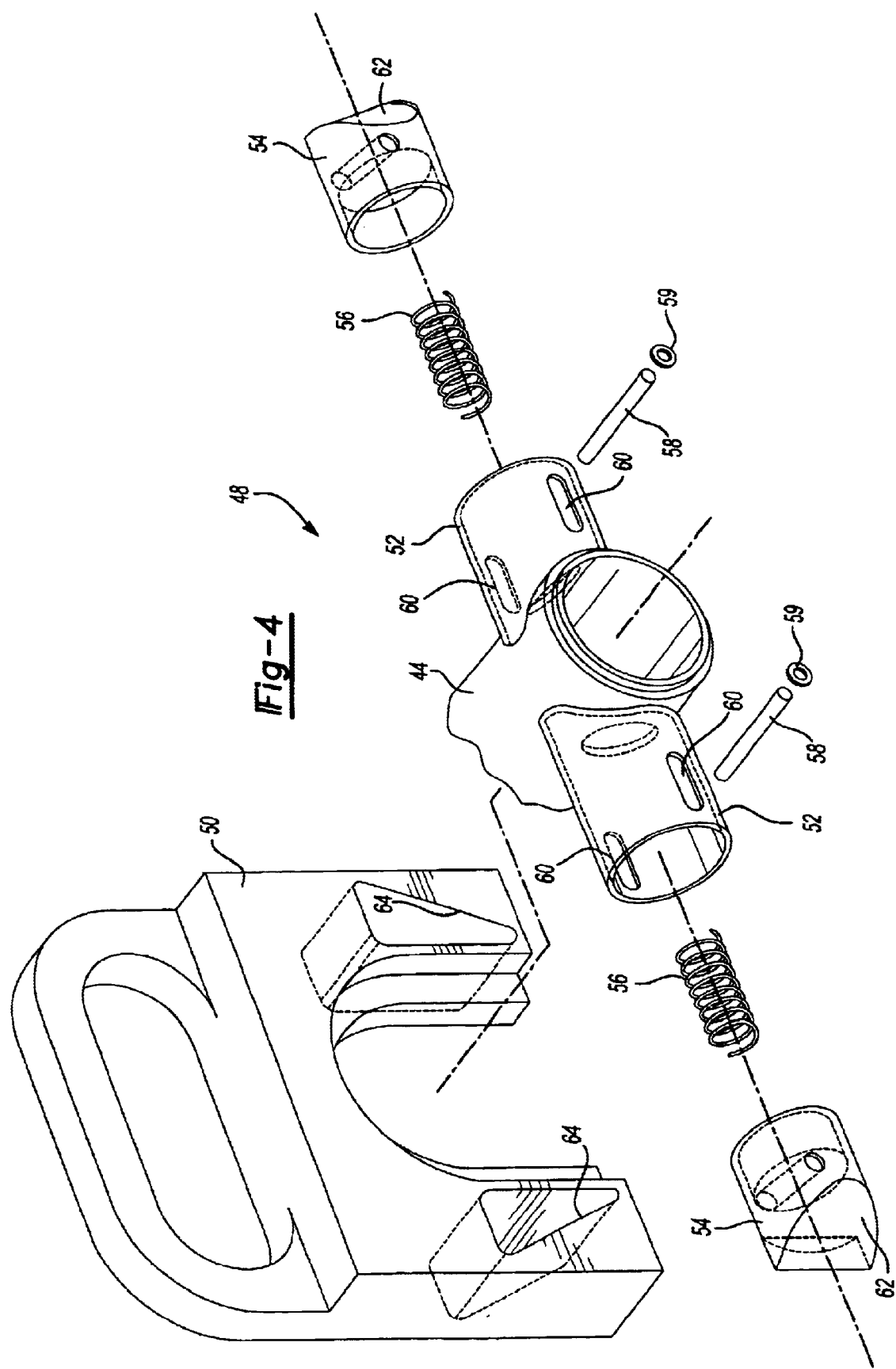
FIG. 4 is an expanded view of a release handle as illustrated in FIG. 3.

Referring to FIG. 3, the drum shaft 32 is rotatably and removably mounted in a sleeve 44 which is fixedly mounted to the support frame assembly 12. The sleeve 44 preferably contains one or more bushings or bearings 47 upon which the shaft 32 rotates. That is, the shaft 32 contacts the bearings and not the inner diameter of the sleeve 44. The sleeve 44 is mounted through a cross brace assembly 46 of the frame assembly 12. The cross brace assembly 46 preferably forms a substantially rigid box arrangement in cooperation with the frame assembly 12.

A snap latch drum release assembly 48 and actuating handle 50 are mounted to the sleeve 44. A first and second latch sleeve 52 extend from the sleeve 44 in a substantially perpendicular arrangement thereto. That is, the latch sleeves 52 and sleeve 44 form a T-shape. Each latch sleeve 52 movably supports a latch 54 which is telescopically mounted therein. The latches 54 are engageable with the inner opening 41 of the plate 40 as will be further described below.

The release assembly 48 biases the movably latches 54 away from the sleeve 44. Preferably, a biasing member 56 such as a spring is located under compression between the sleeve 44 and the latch 54 to bias the respective latches 54 outward (as schematically illustrated by arrows L.) The latch sleeves 52 extend for a linear distance less than the diameter of the inner opening 41 of plate 40. The latches 54 extend from the latch sleeves 52 a linear distance just greater than the diameter of the inner opening 41 of plate 40. A guide pin 58 extends from each latch 54 and is movable within a slot 60 located through each latch sleeve 52. Interaction between the respective guide pin 58 and slot 60 limits the travel of the latch 54 within the latch sleeve 52. Stops 59 are preferably attached to each pin 58 to prevent axial movement thereof. That is, the handle 50 retains one axial end of the pin 58 while the stop 59 retains the opposite end. Other pins and retainers such as springs may also benefit from the present invention to limit axial travel. The slot 60 and pin 58 arrangement also provides an anti rotation feature for the latch 54 to assure that a wedge shaped 62 face of the latch 54 is consistently oriented away from the cross brace assembly 46.

The pin 58 extends through the latch 54 and the latch sleeve 52 such that the pin 58 is also engageable with a cam surface 64 formed in the actuating handle 50. By pulling the actuating handle away from the sleeve 40 (schematically illustrated by arrow U—FIG. 3), the cam surfaces 64 drives the pins 58 and the attached latches 54 into the latch sleeve 52. That is, the latches 54 are telescopically retracted into the latch sleeves 52 (FIG. 5B.)

Figure 5A:
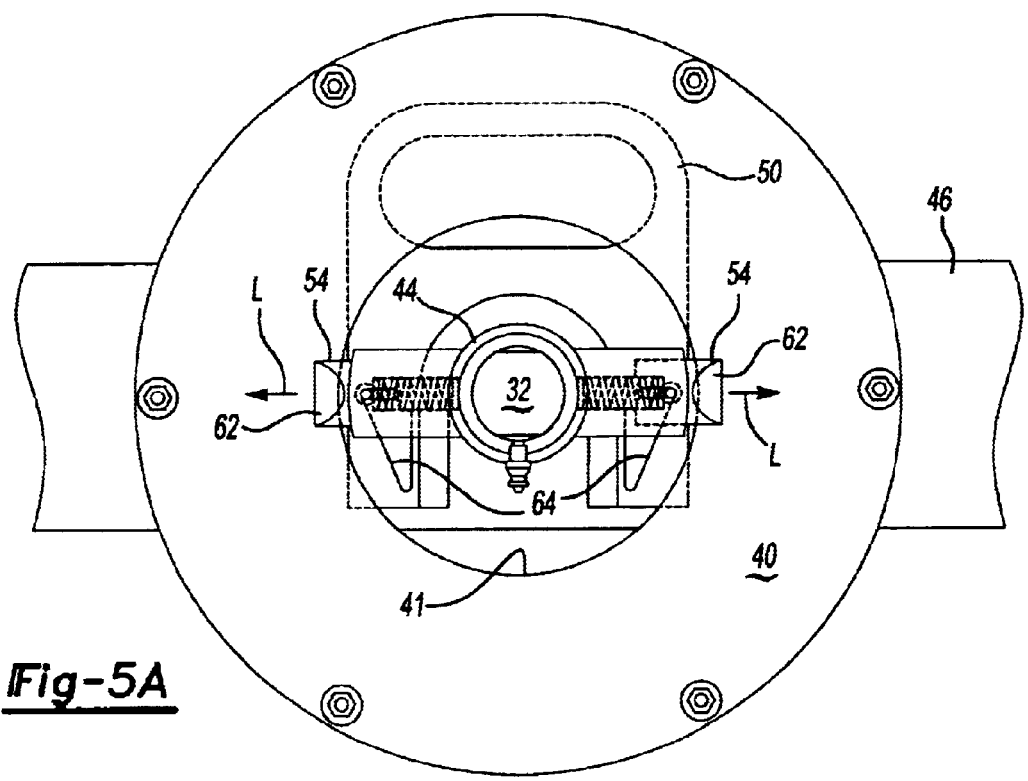
FIG. 5A is a partially phantom view of the snap latch drum release assembly in a locked position.

To mount the drum 14, the drum shaft 32 is pushed into the sleeve 44. As the shaft 32 is pushed into the sleeve 44, the latches 54 contact the inner opening 41 of plate 40. Contact between the wedge shaped 62 face of the latch 54 and inner opening 41, forces the latches 54 to be retracted into the latch sleeves 52 (FIG. 5B.) The bias of each biasing member 56 is therefore overcome as the drum 14 is installed. Once the inner opening 41 of the plate 40 passes the latches 54, the latches are driven outward by the biasing members 56, i.e., telescoped outward from the sleeve 52. The drum 14 is thereby rotatably locked in place by the interaction between the extended latches 54 and the inner opening 41 of the plate 40 (FIG. 5A.)

Figure 5B:
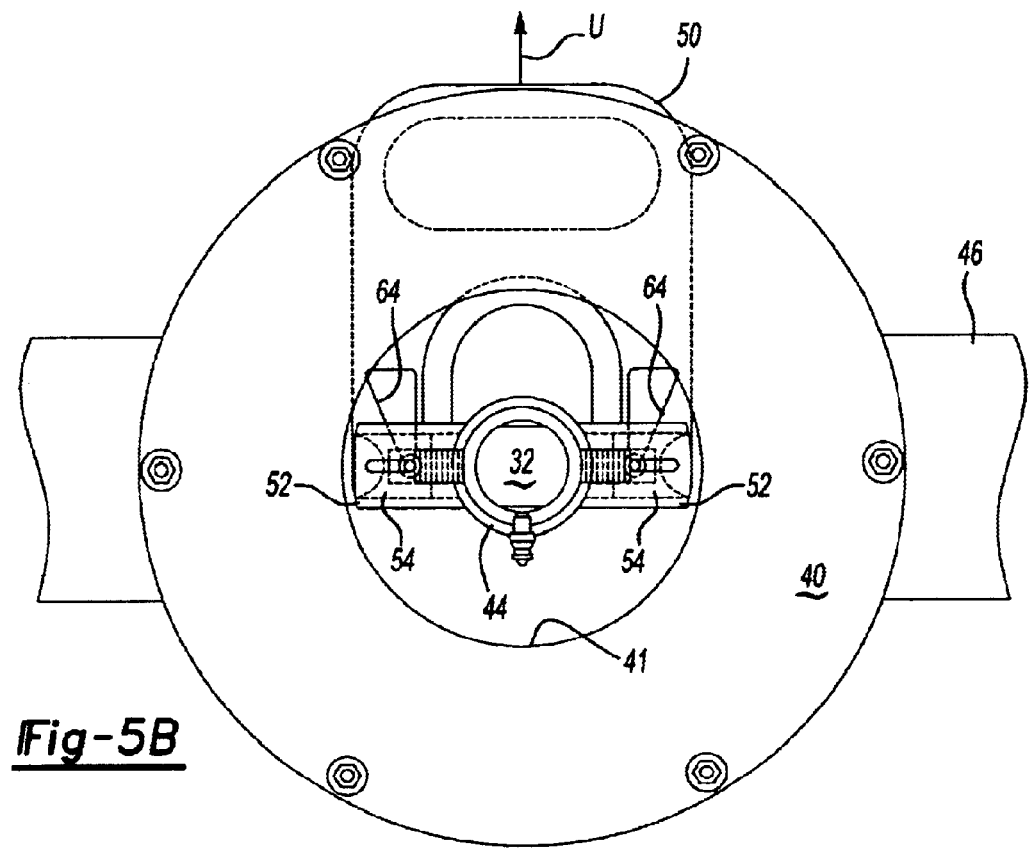
FIG. 5B is a partially phantom view of the snap latch drum release assembly in an unlocked position.

Referring to FIG. 5B, by lifting of the actuating handle 50 (illustrated schematically by arrow U,) the cam surfaces 64 retract the latches 54 into the latch sleeves 52. Once the latches 54 are linearly retracted to a distance less than the inner opening 41 of the plate 40, the drum 14 is released.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A drum release assembly for a drain cleaning machine comprising:
   a sleeve defining an axis of rotation;
   a plate having an inner opening about said axis of rotation;
   a latch movably mounted relative to said inner opening and substantially perpendicular to said axis of rotation; and
   a biasing member to bias said latch away from said axis of rotation.

2. The drum release assembly as recited in claim 1, wherein said plate includes an annular disk.

3. The drum release assembly as recited in claim 2, wherein said disk is fixedly mounted to a rotary drum.

4. The drum release assembly as recited in claim 1, wherein said inner opening of said plate is spaced away from a rotary drum.

5. The drum release assembly as recited in claim 1, further comprising a latch sleeve, said latch telescopically mounted within said latch sleeve to extend past said inner opening.

6. The drum release assembly as recited in claim 5, wherein said latch sleeve extends in a perpendicular arrangement from said sleeve.

7. The drum release assembly as recited in claim 5, wherein said latch sleeve includes a first and second latch sleeve mounted to said sleeve in a T-shaped arrangement.

8. The drum release assembly as recited in claim 1, wherein said latch includes a wedge-shaped face engagable with said inner opening.

9. The drum release assembly as recited in claim 1, further comprising an actuator handle engageable with said latch.

10. The drum release assembly as recited in claim 9, wherein said actuator handle comprises a cam surface engageable with a pin extending from said latch.

11. A release assembly for a drain cleaning machine comprising:
- a sleeve to rotatably receive a rotary drum shaft defining an axis of rotation;
- an annular disk having an inner opening defined about said axis of rotation;
- a latch sleeve extending perpendicular from said sleeve;
- a latch telescopically mounted within said latch sleeve; and
- a biasing member to bias said latch away from said axis of rotation to retain said disk with said latch.

12. The drum release assembly as recited in claim 11, wherein said inner opening of said annular disk is spaced away from said rotary drum.

13. The release assembly as recited in claim 11, wherein said latch extends past said inner opening.

14. The release assembly as recited in claim 11, further comprising an actuator handle having a cam surface engageable with a pin extending from said latch.

15. The release assembly as recited in claim 14, wherein said pin extends through a slot defined by a said latch sleeve.

16. A drain cleaning machine comprising:
- a support frame;
- a removable rotary drum;
- a rotary drum shaft extending from said rotary drum, said rotary drum shaft defining an aids of rotation;
- a drive assembly to rotate said rotary drum about said axis of rotation;
- a sleeve mounted to said frame to rotatably receive said rotary drum shaft;
- an annular disk having an inner opening defined about said aids of rotation, said annular disk mounted to said removable rotary drum, said inner opening spaced away from a face of said removable rotary drum;
- a latch sleeve extending perpendicular from said sleeve;
- a latch telescopically mounted within said latch sleeve; and
- a biasing member to bias said larch away from said axis of rotation to retain said annular disk with said latch.

17. The drain cleaning machine as recited in claim 16, wherein said latch includes a wedge-shaped face engageable with said inner opening.

18. The drain cleaning machine as recited in claim 16, further comprising an actuator handle having a cam surface engageable with a pin extending from said latch.

19. The drain cleaning machine as recited in claim 16, wherein said sleeve contains a bearing to receive said rotary drum shaft.

* * * * *

UNITED STATES PATENT AND TRADEMARK OFFICE
CERTIFICATE OF CORRECTION

PATENT NO. : 6,760,948 B2
DATED : July 13, 2004
INVENTOR(S) : Schmitt

It is certified that error appears in the above-identified patent and that said Letters Patent is hereby corrected as shown below:

Column 5,
Line 5, please delete "defined" after "opening" and before "about"
Line 12, please delete "drum" after "the" and before "release"
Line 21, please delete "a" after "by" and before "said"
Line 26, "aids" should be -- axis --

Column 6,
Line 5, please delete "defined" after "opening" and before "about"
Line 6, "aids" should be -- axis --
Line 12, "larch" should be -- latch --

Signed and Sealed this

Twenty-third Day of November, 2004

JON W. DUDAS
*Director of the United States Patent and Trademark Office*